(12) United States Patent
Chou et al.

(10) Patent No.: US 11,804,706 B1
(45) Date of Patent: Oct. 31, 2023

(54) OVER-VOLTAGE PROTECTION CIRCUIT FOR USE IN USB TYPE-C PORT AND RELATED METHOD

(71) Applicant: ITE Tech. Inc., Hsinchu (TW)

(72) Inventors: Yi-Chung Chou, Taipei (TW);
Chih-Yuan Kuo, New Taipei (TW);
Dong-Shan Chen, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 17/690,005

(22) Filed: Mar. 9, 2022

(30) Foreign Application Priority Data

Feb. 16, 2022 (TW) .................................. 111105603

(51) Int. Cl.
*H02H 3/20* (2006.01)
*H02H 1/00* (2006.01)
*H02H 9/04* (2006.01)
*H02H 3/26* (2006.01)

(52) U.S. Cl.
CPC ............. *H02H 3/20* (2013.01); *H02H 1/0007* (2013.01); *H02H 9/04* (2013.01); *H02H 9/046* (2013.01); *H02H 3/26* (2013.01)

(58) Field of Classification Search
CPC .......... H02H 3/20; H02H 3/26; H02H 7/1222; H02H 7/1252; H02H 7/1227; H02H 9/04; H02H 9/046

USPC ......................................................... 361/91.1
See application file for complete search history.

(56) References Cited

U.S. PATENT DOCUMENTS

| 10,320,180 | B1* | 6/2019 | Venigalla ............... H02H 3/087 |
| 2020/0067304 | A1* | 2/2020 | Kim ..................... H02H 1/0007 |
| 2021/0226444 | A1* | 7/2021 | Fang .................. H03K 17/0822 |
| 2021/0367383 | A1* | 11/2021 | Dhanasekaran ..... H01R 13/713 |

* cited by examiner

*Primary Examiner* — Danny Nguyen
(74) *Attorney, Agent, or Firm* — Winston Hsu

(57) ABSTRACT

An over-voltage protection circuit includes an over-voltage detection circuit, a voltage generator and a switch for providing over-voltage protection between two pins of a USB Type-C port. The over-voltage detection circuit provides an over-voltage signal according to the level of the second pin. The switch includes a first end coupled to the first pin, a second end coupled to the second pin and a control end coupled to a control signal. When the over-voltage signal does not indicate an over-voltage occurrence at the second pin, the voltage generator provides the control signal having a first level for operating the switch in a first region. When the over-voltage signal indicates an over-voltage occurrence at the second pin, the voltage generator adjusts the control signal to a second level for cutting off the switch. The switch operates in a second region after the over-voltage occurrence and before the switch is cut off.

13 Claims, 6 Drawing Sheets

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

FIG. 1 PRIOR ART

OVER-VOLTAGE PROTECTION CIRCUIT FOR USE IN USB TYPE-C PORT AND RELATED METHOD

BACKGROUND OF THE INVENTION

1. Field of the Invention

The present invention is related to an over-voltage protection circuit for use in a USB port and a related method, and more particularly, to an over-voltage protection circuit for use in a USB Type-C port and a related method.

2. Description of the Prior Art

With rapid development in technology, data transmission and data sharing has become very common in daily life. Data stored in one device may be transmitted to another device in a wired or wireless manner. To achieve that, data transmission ports with various specifications are implemented on electronic devices, such as computer hosts, cameras or mobile communication devices. For example, the data stored in a memory card may be transmitted to a hard disc in a computer for data storage or backup using a card reader which is compatible with universal serial bus (USB) ports.

Based on the physical design of the connectors and ports, there are three different types of USB cables: Type-A, Type-B and Type-C, wherein Type-A and Type-B further include two configurations: micro USB port and mini USB port. USB ports with recent Type-C specifications are characterized in thin appearance, ease of plug/unplug, high-current charging and fast data transfer. Meanwhile, a USB Type-C connector also supports bi-directional plug/unplug in which a downstream facing port (DFP) on the power transmitting side may communicate with an upstream facing port (UFP) on the power receiving side regardless of the plug orientation.

FIG. 1 is a diagram illustrating the pin definition of an existing USB Type-C port. As depicted in FIG. 1, the USB Type-C port includes 24 pins respectively arranged on upper locations A1-A12 and lower locations B1-B12. The ground pins GND are arranged on the locations A1/A12/B1/B12. The super speed differential signal pins TX1+/TX1− and TX2+/TX2− of the first group are arranged on the locations A2/A3/B2/B3. The super speed differential signal pins RX1+/RX1− and RX2+/RX2− of the second group are arranged on the locations B10/B11/A10/A11. The power bus pins VBUS are arranged on the locations A4/A9/B4/B9. The first configuration channel pin CC1 is arranged on the location A5. The second configuration channel pin CC2 is arranged on the location B5. The differential signal pins D+ and D− are arranged on the locations A6/B6/A7/B7. The side band use pins SBU1 and SBU2 are respectively arranged on the locations A8/B8. As depicted in FIG. 1, the power bus pin VBUS arranged on the location A4 is adjacent to the first configuration channel pin CC1 arranged on the location A5, and the power bus pin VBUS arranged on the location B4 is adjacent to the second configuration channel pin CC2 arranged on the location B5.

Functionally, the configuration channel pins CC1 and CC2 are used to detect attach of USB ports, resolve cable orientation and twist connections to establish USB data bus routing, establish data roles between two attached ports, discover and configure the power bus pin VBUS, and configure a supply voltage Vconn. For example, based on the voltage levels of the first configuration channel pin CC1 arranged on the location A5 and the second configuration channel pin CC2 arranged on the location B5, the USB Type-C device on the power receiving side may acquire the maximum current provided by the USB Type-C device on the power transmitting side for optimizing power usage. According to USB Type-C specifications, when a source device is connected to a sink device via the first configuration channel pin CC1, the source device is required to bias the second configuration channel pin CC2 (not connected to the sink device) to the supply voltage Vconn. When the sink device requests the source device to provide voltages larger than 5V according to the USB power supply specification requirement, the source device is configured to raise the voltage level of the power bus pins VBUS (such as to 20V). Under such circumstance, when the user inadequately removes the sink device (such as by unplugging the USB cable connecting the source device and the sink device), the power bus pin VBUS may be short-circuited to the configuration channel pin CC1 or CC2. Therefore, there is a need to provide over-voltage protection between two adjacent pins of USB Type-C ports.

SUMMARY OF THE INVENTION

The present invention provides an over-voltage protection circuit for use in a USB Type-C port. The over-voltage protection circuit includes a first node coupled to a supply voltage, a second node coupled to a first pin or a second pin of the USB Type-C port, an over-voltage detection circuit, a switch and a voltage generator. The over-voltage detection circuit is configured to provide an over-voltage signal according to a voltage level of the second node. The switch includes a first end coupled to the first node, a second end coupled to the second node and a control end coupled to a switch control signal. The voltage generator is configured to provide the switch control signal and adjust a level of the switch control signal according to the over-voltage signal. When the over-voltage signal does not indicate that an over-voltage occurs at the second node, the voltage generator is configured to provide the switch control signal having a first level for operating the switch in a first region. When the over-voltage signal indicates that the over-voltage occurs at the second node, the voltage generator is configured to adjust the switch control signal from the first level to a second level for cutting off the switch. The switch is configured to operate in a second region during a period after the switch control signal is adjusted from the first level to the second level and before the switch is cut off.

The present invention also provides a method of providing over-voltage protection in a USB Type-C port. The method includes providing a supply voltage to a first node; coupling a first pin or a second pin of the USB Type-C port to a second node; a switch selectively conducting or cutting off a signal transmission path between the first node and the second node; detecting a voltage level of the second node and providing a corresponding over-voltage signal; providing the switch control signal having a first level for turning on the switch when the over-voltage signal does not indicate that an over-voltage occurs at the second node, so that the switch operates in a first region when no over-voltage occurs at the second node and operates in a second region during a period after the over-voltage occurs at the second node and before the switch is cut off; and adjusting the switch control signal from the first level to a second level for cutting off the switch when the over-voltage signal indicates that the over-voltage occurs at the second node.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram illustrating the pin definition of an existing USB Type-C port.

DETAILED DESCRIPTION

Figure 2:
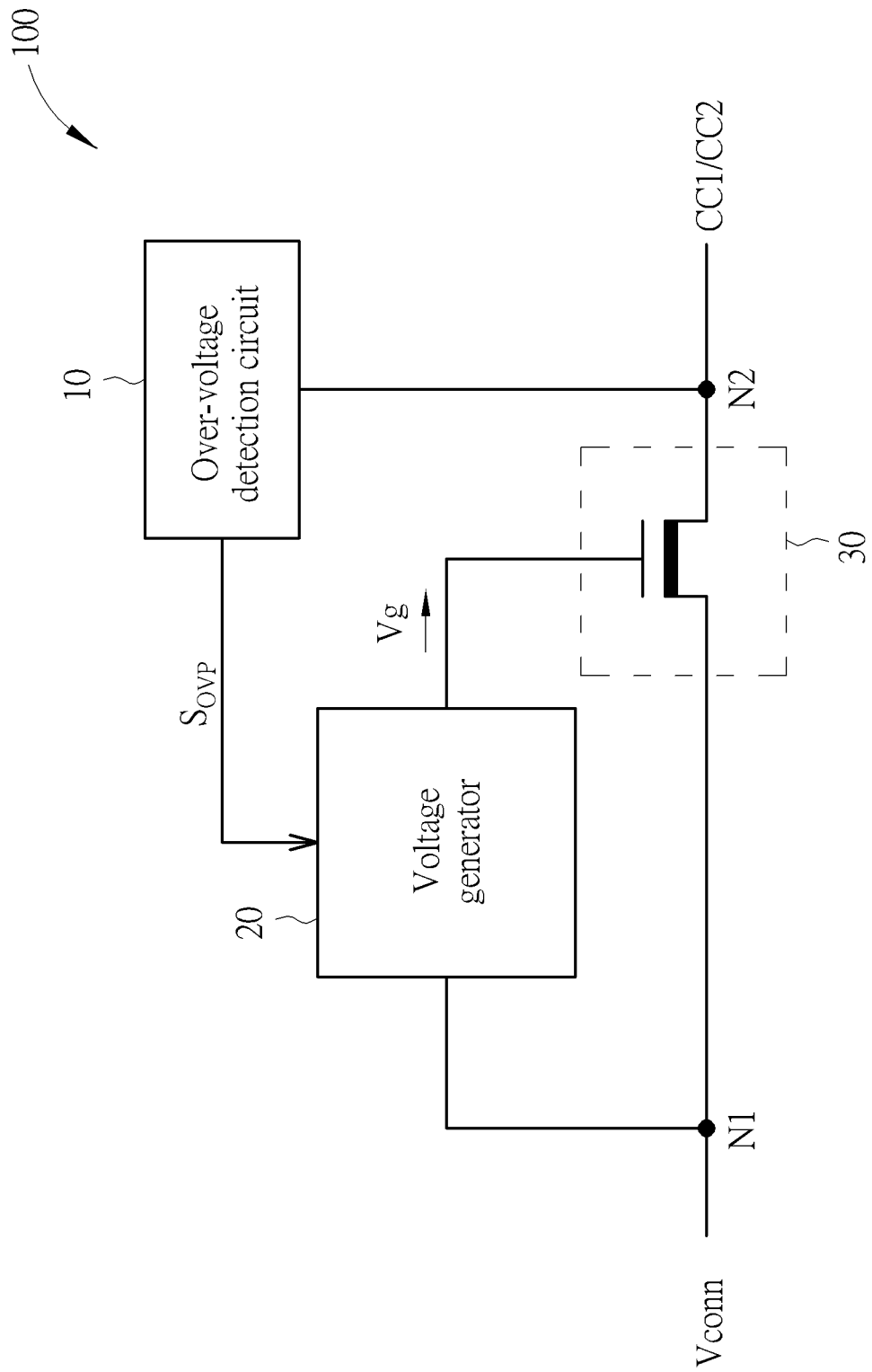
FIG. 2 is a diagram illustrating an over-voltage protection circuit for use in a USB Type-C port according to an embodiment of the present invention.

FIG. 2 is a diagram illustrating an over-voltage protection circuit 100 for use in a USB Type-C port according to an embodiment of the present invention. The over-voltage protection circuit 100 includes a first node N1, a second node N2, an over-voltage detection circuit 10, a voltage generator 20, and a switch 30. The first node N1 and the second node N2 of the over-voltage protection circuit 100 may be coupled to two adjacent pins of the USB Type-C port for providing over-voltage protection. In the embodiment illustrated in FIG. 2, the first node N1 may be coupled to a supply voltage Vconn and selectively coupled to the configuration channel pin CC1 or CC2 depicted in FIG. 1 via the switch 30, and the second node N2 may be coupled to the configuration channel pin CC1 or CC2 depicted in FIG. 1. However, the configuration depicted in FIG. 2 does not limit the scope of the present invention.

The over-voltage detection circuit 10 is coupled between the voltage generator 20 and the second node N2 for monitoring the voltage level of the second node N2, thereby providing an over-voltage signal $S_{OVP}$ associated with the voltage level of the second node N2. In an embodiment, the over-voltage detection circuit 10 may include a sensing resistor and the over-voltage signal $S_{OVP}$ is the current flowing through the sensing resistor, wherein the value of the over-voltage signal $S_{OVP}$ is proportional to the voltage level of the second node N2. However, the implementation of the over-voltage detection circuit 10 does not limit the scope of the present invention.

The voltage generator 20 is configured to provide a switch control signal Vg and adjust the level of the switch control signal Vg according to the over-voltage signal $S_{OVP}$, thereby selectively turning on or turning off the switch 30. In an embodiment, the voltage generator 20 may be a charge pump. However, the implementation of the voltage generator 20 does not limit the scope of the present invention.

The switch 30 includes a first end coupled to the first node N1, a second end coupled to the second node N2, and a control end coupled to the switch control signal Vg. In an embodiment, the switch 30 may be a low-resistance device, such as an N-type metal oxide semiconductor field effect transistor (NMOSFET), wherein the first end of the switch 30 is a drain terminal, the second end of the switch 30 is a source terminal and the control end of the switch 30 is a gate terminal. However, the type of the switch 30 does not limit the scope of the present invention.

Figure 3:
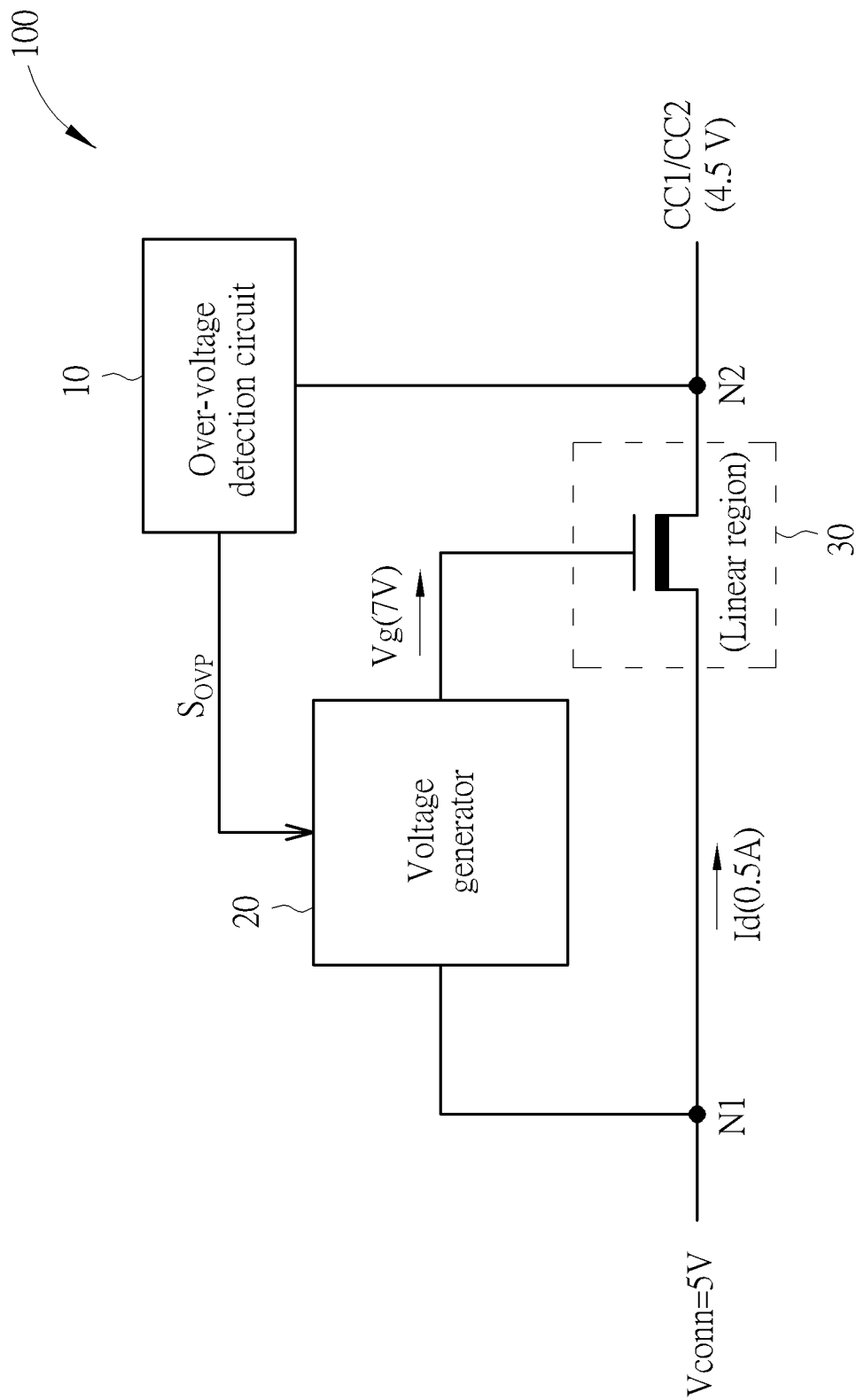
FIG. 3 is a diagram illustrating the operation of over-voltage protection circuit with the over-voltage protection function deactivated according to an embodiment of the present invention.
Figure 4:
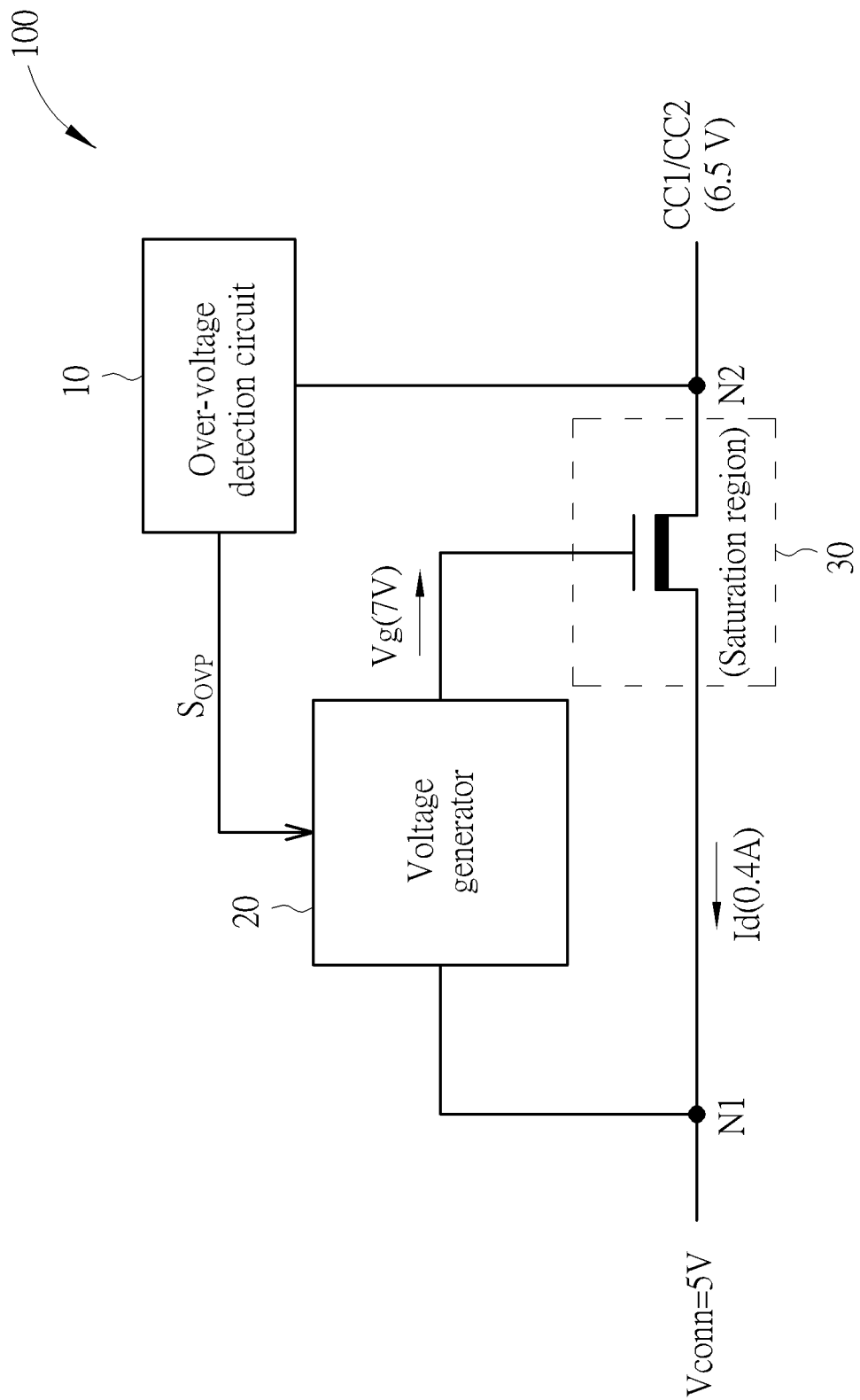
FIG. 4 is a diagram illustrating the operation of over-voltage protection circuit with the over-voltage protection function activated according to an embodiment of the present invention.
Figure 5:
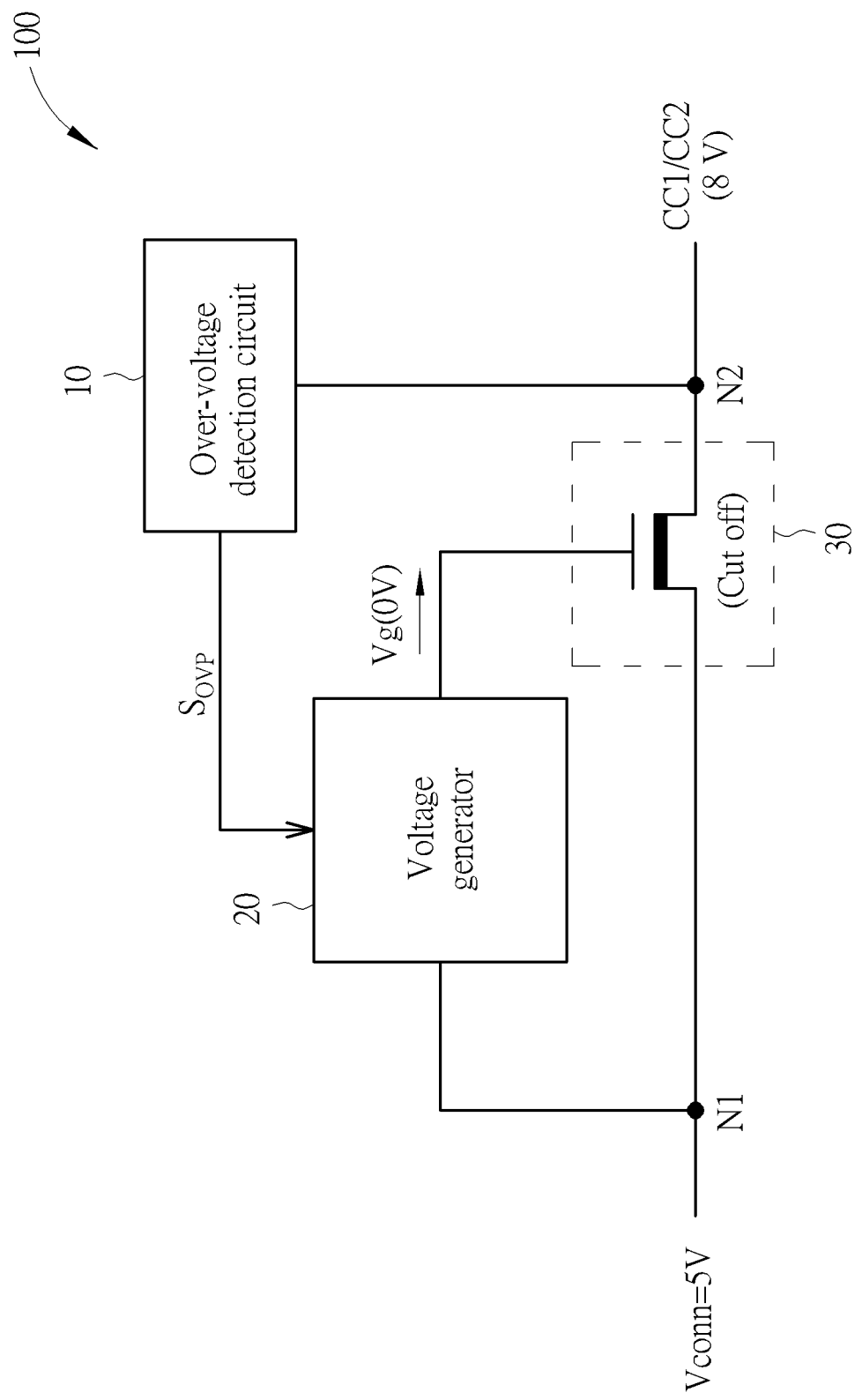
FIG. 5 is a diagram illustrating the operation of over-voltage protection circuit with the over-voltage protection function activated according to an embodiment of the present invention.

FIG. 3 is a diagram illustrating the operation of over-voltage protection circuit 100 with the over-voltage protection function deactivated according to an embodiment of the present invention. FIGS. 4 and 5 are diagrams illustrating the operation of over-voltage protection circuit 100 with the over-voltage protection function activated according to an embodiment of the present invention. For illustrative purpose, it is assumed that the first node N1 is coupled to the supply voltage Vconn, the second node N2 is coupled to the configuration channel pin CC1 or CC2 depicted in FIG. 1, and the switch 30 is an NMOSFET.

When the switch 30 operates in a linear region, its drain-source voltage VDS is smaller than the difference between its gate-source voltage VGS and its threshold voltage Vth (VDS<VGS−Vth), and the value of the conducting current Id is represented by the following equation (1). When the switch 30 operates in a saturation region, its drain-source voltage VDS is larger than the difference between its gate-source voltage VGS and its threshold voltage Vth (VDS>VGS−Vth), and the value of the conducting current Id is represented by the following equation (2), wherein $\mu_n$ represents the electron mobility of the inversion layer and Cox represents the capacitance of oxidation layer per unit area.

$$Id=\mu_n Cox(W/L)*(2(VGS-Vth)VDS-VDS^2) \quad (1)$$

$$Id=0.5*\mu_n Cox(W/L)*(VGS-Vth)^2 \quad (2)$$

In the present invention, when the over-voltage protection circuit 100 deactivates the over-voltage protection function, the switch 30 is configured to operate in the linear region (as depicted in FIG. 3); when the over-voltage protection circuit 100 activates the over-voltage protection function, the switch 30 operates in the saturation region first (as depicted in FIG. 4) before being cut off (as depicted in FIG. 5).

In the embodiment illustrated in FIG. 3, it is assumed that the supply voltage Vconn is 5V, the threshold voltage Vth of the switch 30 is 1V, the value of $\mu_n Cox(W/L)$ is 0.8, the configuration channel pin CC1 is used to detect the connection between the source device and the sink device, and the supply voltage Vconn is outputted to the cable via the configuration channel pin CC2. When the load current on the configuration channel pin CC2 is 500 mA, the voltage established on the configuration channel pin CC2 does not exceed 4.5V when the configuration channel pin CC2 is not short-circuited to another pin. Under such circumstance, the over-voltage signal $S_{OVP}$ provided by the over-voltage detection circuit 10 does not indicate any over-voltage occurrence, and the switch control signal Vg provided by the voltage generator 20 according to the over-voltage signal $S_{OVP}$ allows the switch 30 to operate in the linear region for providing the conducting current Id. More specifically, when the voltage generator 20 provides the switch control signal Vg equal to 7V, the gate-source voltage VGS of the switch 30 is equal to 2.5V and the drain-source voltage VDS of the switch 30 is equal to 0.5V. Based on equation (1), the conducting current Id provided by the switch 30 in the linear region is about 0.5 A and flows from the first end of the switch 30 to the second end of the switch 30.

In the embodiment illustrated in FIG. 4, it is assumed that the supply voltage Vconn is 5V, the threshold voltage Vth of the switch 30 is 1V, the value of $\mu_n$Cox(W/L) is 0.8, the configuration channel pin CC1 is used to detect the connection between the source device and the sink device, and the supply voltage Vconn is outputted to the cable via the configuration channel pin CC2. The voltage established on the configuration channel pin CC2 rapidly rises (may be as high as 20V) when short-circuited to another pin. When the voltage established on the configuration channel pin CC2 reaches a shirt-circuit threshold voltage (such as 6.5V), the over-voltage signal $S_{OVP}$ provided by the over-voltage detection circuit 10 indicates the occurrence of the over voltage, and the voltage generator 20 is configured to reduce the level of the switch control signal Vg according to the over-voltage signal $S_{OVP}$ for cutting off the switch 30. However, due to the reaction time of the over-voltage detection circuit 10 and the voltage generator 20, the voltage established on the configuration channel pin CC2 continues to rise until the switch 30 is cut off. During the period after the configuration channel pin CC2 is short-circuited and before the switch control signal Vg is reduced to 0, the maximum gate-source voltage VGS of the switch 30 is 2V, which allows the switch 30 to operate in the saturation region. Based on equation (2), the conducting current Id provided by the switch 30 in the saturation region is about 0.4 A and flows from the second end of the switch 30 to the first end of the switch 30.

In the embodiment illustrated in FIG. 5, it is also assumed that the configuration channel pin CC1 is used to detect the connection between the source device and the sink device, and the supply voltage Vconn is outputted to the cable via the configuration channel pin CC2. After the over-voltage detection circuit 10 reduces the switch control signal Vg to 0, the voltage established on the configuration channel pin CC2 continues to rise until the switch 30 is cut off. During the period after the configuration channel pin CC2 is short-circuited and before the switch 30 is cut off, it is assumed that the maximum voltage established on the configuration channel pin CC2 is 8V. After the switch 30 is cut off, the conducting current Id equal to 0 A, which isolates the first node N1 (the supply voltage Vconn) from the second node N2 (the configuration channel pin CC2), thereby preventing the over-voltage occurring on the configuration channel pin CC2 to damage the USB Type-C port via the power bus pin VBUS.

Similarly, in another embodiment, the configuration channel pin CC2 is used to detect the connection between the source device and the sink device, and the supply voltage Vconn is outputted to the cable via the configuration channel pin CC1. When the over-voltage protection circuit 100 activates the over-voltage protection function after detecting that the configuration channel pin CC1 is short-circuited, the switch 30 operates in the saturation region first (as depicted in FIG. 4) before being cut off (as depicted in FIG. 5), thereby preventing the over-voltage occurring on the configuration channel pin CC1 to damage the USB Type-C port via the power bus pin VBUS.

Figure 6:
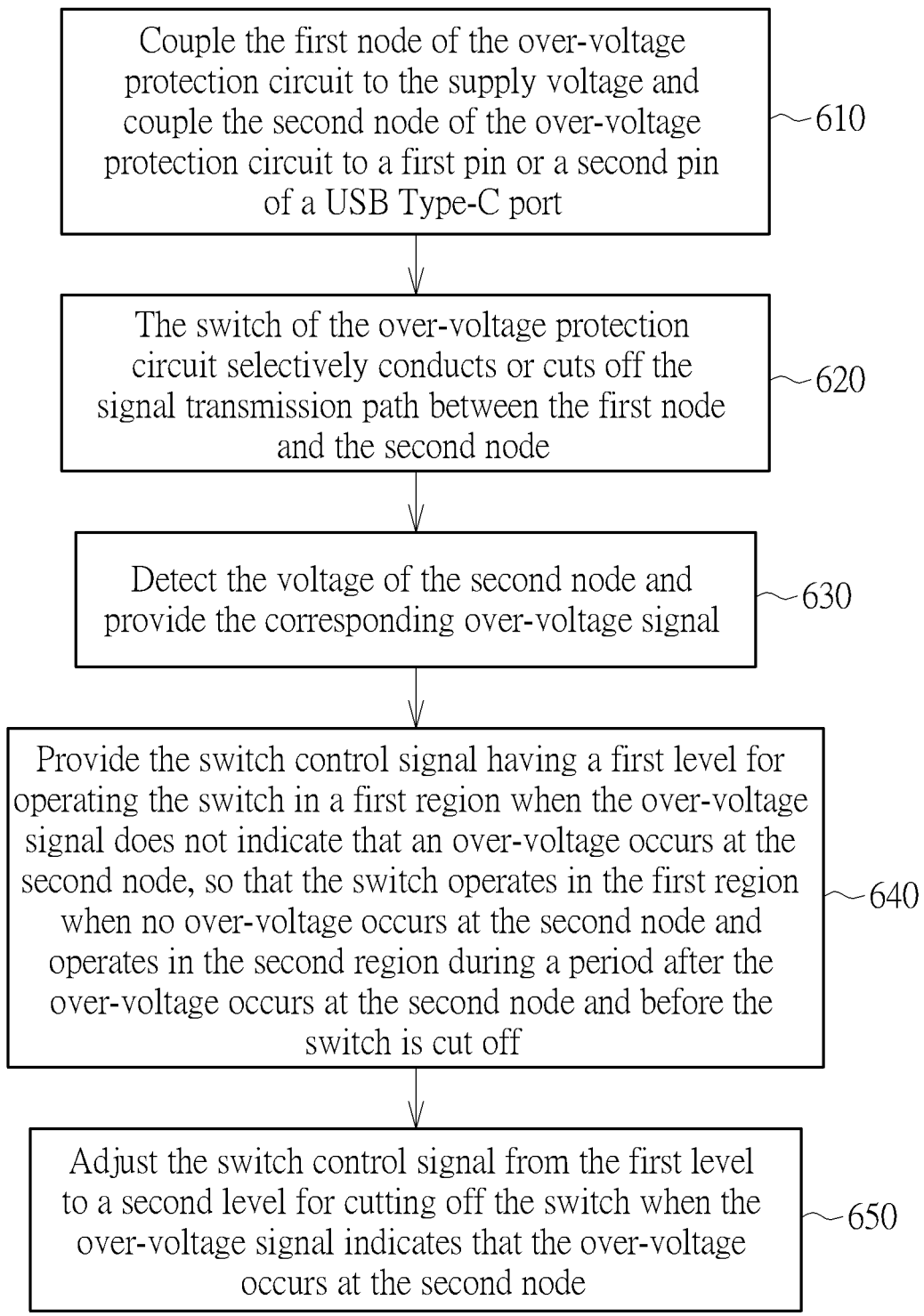
FIG. 6 is a flowchart illustrating the operation of the over-voltage protection circuit according to an embodiment of the present invention.

FIG. 6 is a flowchart illustrating the operation of the over-voltage protection circuit 100 according to an embodiment of the present invention. The flowchart in FIG. 6 includes the following steps:

Step 610: couple the first node N1 of the over-voltage protection circuit 100 to the supply voltage Vconn, and couple the second node N2 of the over-voltage protection circuit 100 to a first pin or a second pin of a USB Type-C port.

Step 620: the switch 30 of the over-voltage protection circuit 100 selectively conducts or cuts off the signal transmission path between the first node N1 and the second node N2.

Step 630: detect the voltage of the second node N2 and provide the corresponding over-voltage signal $S_{OVP}$.

Step 640: provide the switch control signal Vg having a first level for operating the switch 30 in a first region when the over-voltage signal $S_{OVP}$ does not indicate that an over-voltage occurs at the second node, so that the switch operates in the first region when no over-voltage occurs at the second node N2 and operates in the second region during a period after the over-voltage occurs at the second node N2 and before the switch 30 is cut off.

Step 650: adjust the switch control signal Vg from the first level to a second level for cutting off the switch 30 when the over-voltage signal $S^{OVP}$ indicates that the over-voltage occurs at the second node N2.

In the embodiment when the switch 30 is an NMOSFET, the first region is the linear region, the second region is the saturation region, and the first level is higher than the second level.

In the present invention, the value of the first level is determined based on the device characteristics of the switch 30, the load current of the second node N2, and the maximum voltage of the second node N2 after the over-voltage occurs at the second node N2 and before the switch 30 is cut off. This way, when no over-voltage occurs at the second node N2, the switch control signal Vg having the first level allows the switch 30 to operate in the first region (linear region); during the period after the over-voltage occurs at the second node N2 and before the switch 30 is cut off, the switch control signal Vg having the first level allows the switch 30 to operate in the second region (saturation region). Referring to FIGS. 3-5, it is assumed that the supply voltage Vconn is 5V, and the switch 30 is a 5V NMOSFET. Under such circumstance, the first level of the switch control signal Vg may be set to 7V in the present invention, so that the switch 30 may operate in the linear region when no over-voltage occurs at the second node N2 (the bias condition depicted in FIG. 3) and operate in the saturation region during the period after the over-voltage occurs at the second node N2 and before the switch 30 is cut off (the bias condition depicted in FIG. 4). However, the voltage values and current values depicted in FIGS. 3-5 are only for illustrative purpose and do not limit the scope of the present invention.

In conclusion, the over-voltage protection circuit of the present invention can be used in a USB Type-C port for providing over-voltage protection between two adjacent pins of the USB Type-C port. When no over-occurrence is detected, the switch in the over-voltage protection circuit is configured to operate in the linear region for conducting the signal transmission path between the two adjacent pins of the USB Type-C port. When detecting an over-occurrence, the switch in the over-voltage protection circuit is configured to operate in the saturation region before being cut off, thereby cutting off the signal transmission path between the two adjacent pins of the USB Type-C port.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An over-voltage protection circuit for use in a USB Type-C port, comprising:
   a first node coupled to a supply voltage;
   a second node coupled to a first pin or a second pin of the USB Type-C port;
   an over-voltage detection circuit configured to provides an over-voltage signal according to a voltage level of the second node;
   a switch including:
      a first end coupled to the first node;
      a second end coupled to the second node; and
      a control end coupled to a switch control signal; and
   a voltage generator configured to provide the switch control signal and adjust a level of the switch control signal according to the over-voltage signal, wherein:
      when the over-voltage signal does not indicate that an over-voltage occurs at the second node, the voltage generator is configured to provide the switch control signal having a first level for operating the switch in a first region;
      when the over-voltage signal indicates that the over-voltage occurs at the second node, the voltage generator is configured to adjust the switch control signal from the first level to a second level for cutting off the switch;
      the switch is configured to operate in a second region during a period after the switch control signal is adjusted from the first level to the second level and before the switch is cut off;
      a first conducting current flows from the first end of the switch to the second end of the switch when the switch operates in the first region;
      a second conducting current flows from the second end of the switch to the first end of the switch when the switch operates in the second region;
      a value of the first conducting current is proportional to a voltage difference between the control end of the switch and the second end of the switch; and
      a value of the second conducting current is proportional to a square of the voltage difference between the control end of the switch and the second end of the switch.

2. The over-voltage protection circuit of claim 1, wherein:
   the first pin is a first configuration channel pin(CC1) of the USB Type-C port; and
   the second pin is a second configuration channel pin(CC2) of the USB Type-C port.

3. The over-voltage protection circuit of claim 1, wherein:
   the switch is an N-type metal oxide semiconductor field effect transistor (NMOSEFT);
   the first end of the switch is a drain terminal;
   the second end of the switch is a source terminal; and
   the control end of the switch is a gate terminal.

4. The over-voltage protection circuit of claim 3, wherein:
   the first region is a linear region;
   a first conducting current flows from the first end of the switch to the second end of the switch when the switch operates in the linear region;
   a value of the first conducting current is proportional to $2(VGS-Vth)VDS-VDS^2$;
   VGS represents a gate-source voltage of the switch;
   VDS represents a drain-source voltage of the switch; and
   Vth represents a threshold voltage of the switch.

5. The over-voltage protection circuit of claim 3, wherein:
   the second region is a saturation region;
   the second conducting current flows from the second end of the switch to the first end of the switch when the switch operates in the saturation region;
   a value of the second conducting current is proportional to $(VGS-Vth)^2$;
   VGS represents a gate-source voltage of the switch; and
   Vth represents a threshold voltage of the switch.

6. The over-voltage protection circuit of claim 3, wherein:
   when the control end of the switch receives the switch control signal having the first level and the over-voltage signal does not indicate that the over-voltage occurs at the second node, VDS<VGS−Vth;
   VGS represents a gate-source voltage of the switch;
   VDS represents a drain-source voltage of the switch; and
   Vth represents a threshold voltage of the switch.

7. The over-voltage protection circuit of claim 3, wherein:
   when the control end of the switch receives the switch control signal having the first level and the over-voltage signal indicates that the over-voltage occurs at the second node, VDS>VGS−Vth;
   VGS represents a gate-source voltage of the switch;
   VDS represents a drain-source voltage of the switch; and
   Vth represents a threshold voltage of the switch.

8. The over-voltage protection circuit of claim 3, wherein the voltage generator is a charge pump.

9. The over-voltage protection circuit of claim 1, wherein a value of the first level is determined based on a device characteristic of the switch, a load current of the second node, and a maximum voltage of the second node after the over-voltage occurs and before the switch is turned off.

10. A method of providing over-voltage protection in a USB Type-C port, comprising:
    providing a supply voltage to a first node;
    coupling a first pin or a second pin of the USB Type-C port to a second node;
    a switch selectively conducting or cutting off a signal transmission path between the first node and the second node;
    detecting a voltage level of the second node and providing a corresponding over-voltage signal;
    providing the switch control signal having a first level for turning on the switch when the over-voltage signal does not indicate that an over-voltage occurs at the second node, so that the switch operates in a first region when no over-voltage occurs at the second node and operates in a second region during a period after the over-voltage occurs at the second node and before the switch is cut off; and
    adjusting the switch control signal from the first level to a second level for cutting off the switch when the over-voltage signal indicates that the over-voltage occurs at the second node, wherein:
       the switch includes a first end coupled to the first node, a second end coupled to the second node, and a control end coupled to the switch control signal;
       a first conducting current flows from the first end of the switch to the second end of the switch when the switch operates in the first region;
       a second conducting current flows from the second end of the switch to the first end of the switch when the switch operates in the second region;
       a value of the first conducting current is proportional to a voltage difference between the control end of the switch and the second end of the switch; and a value of the second conducting current is proportional to a square of the voltage difference between the control end of the switch and the second end of the switch.

11. The method of claim 10, wherein:
the first pin is a first configuration channel pin(CC1) of the USB Type-C port; and
the second pin is a second configuration channel pin(CC2) of the USB Type-C port.

12. The method of claim 10, wherein:
the switch is an N-type metal oxide semiconductor field effect transistor (NMOSEFT);
the first region is a linear region; and
the second region is a saturation region.

13. The method of claim 10, further comprising:
determining a value of the first level based on a device characteristic of the switch, a load current of the second node, and a maximum voltage of the second node after the over-voltage occurs and before the switch is turned off.

\* \* \* \* \*